G. HOLTZ.
SANITARY DENTAL BRACKET TABLE.
APPLICATION FILED MAR. 9, 1910.
979,493.
Patented Dec. 27, 1910.
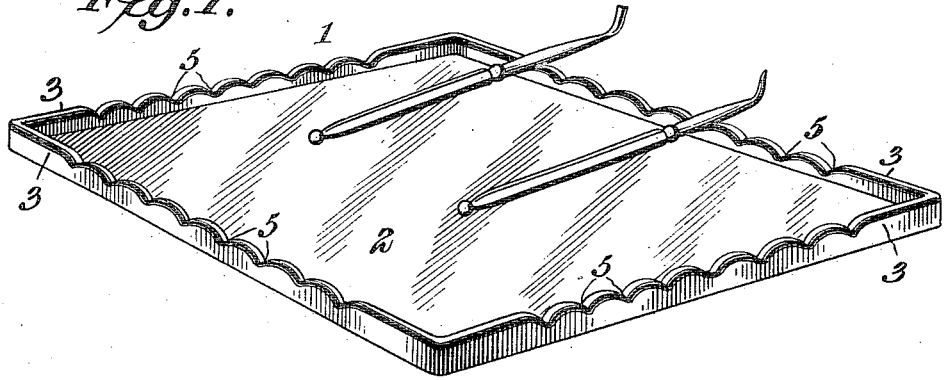
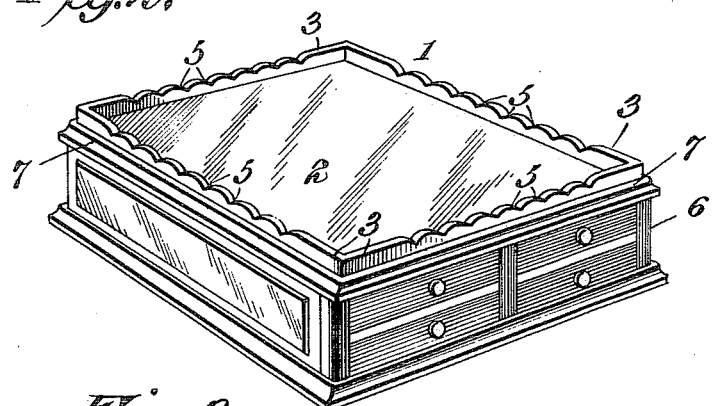
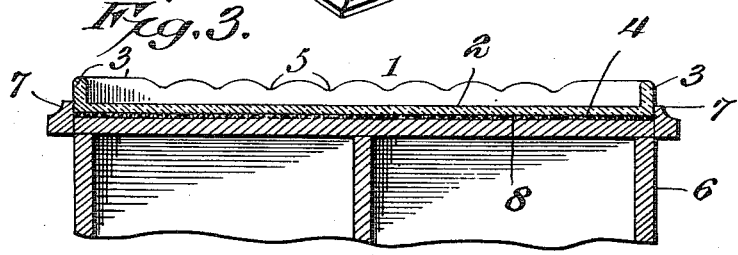
Gustav Holtz, Inventor,
Witnesses

UNITED STATES PATENT OFFICE.

GUSTAV HOLTZ, OF GOULDSBORO, PENNSYLVANIA.

SANITARY DENTAL BRACKET-TABLE.

979,493.　　　　Specification of Letters Patent.　　Patented Dec. 27, 1910.

Original application filed March 26, 1909, Serial No. 485,928. Divided and this application filed March 9, 1910. Serial No. 548,231.

*To all whom it may concern:*

Be it known that I, GUSTAV HOLTZ, a citizen of the United States, residing at Gouldsboro, in the county of Wayne and State of Pennsylvania, have invented a new and useful Sanitary Dental Bracket-Table, of which the following is a specification.

The invention relates to a sanitary dental bracket table, and is a division of the application filed by me Mar. 26, 1909, Serial No. 485,928.

The primary object of the invention is to enable an ordinary wooden dental bracket table to be maintained in a perfectly sanitary condition, and to equip the same with a sanitary dental bracket tray, adapted to be readily applied to the ordinary wooden dental bracket table in present use, and capable of being held firmly thereon against accidental displacement, and adapted to be removed when it is desired to clean it, and having means for holding instruments separated from one another and for preventing the instruments from rolling.

With these and other objects in view, the invention consists in the construction and novel combination of parts hereinafter fully described, illustrated in the accompanying drawing, and pointed out in the claim hereto appended; it being understood that various changes in the form, proportion, size and minor details of construction, within the scope of the claim, may be resorted to without departing from the spirit or sacrificing any of the advantages of the invention.

In the drawing:—Figure 1 is a perspective view of a dental bracket tray, constructed in accordance with this invention. Fig. 2 is a similar view showing the tray applied to a wooden dental bracket table. Fig. 3 is a sectional view of the same.

Like numerals of reference designate corresponding parts in all the figures of the drawing.

1 designates a dental bracket tray, designed to be constructed of glass, china, porcelain or analogous material and presenting a smooth polished non-absorbent surface, adapted to be readily cleaned and maintained in a perfectly sanitary condition. The dental bracket tray 1, which is shallow and removable to enable it to be easily and thoroughly cleaned, consists of a flat bottom 2 and marginal walls 3, formed integral with the bottom, the dental bracket tray being constructed of a single piece of material of the character before described. The upper and lower faces of the bottom of the tray are perfectly flat, and the lower face 4 is preferably frosted to present a semi-transparent effect and to slightly roughen the bottom to prevent the hand from slipping. This will prevent the tray from accidentally slipping out of the hands of a person. The upper face and the marginal walls are smooth and highly polished to facilitate thorough cleaning. The marginal walls, which are designed to support the dental instruments in the usual manner, are provided with scalloped edges, forming spaced instrument-receiving notches 5 and adapted to hold instruments separated, and capable of preventing the instruments from rolling. The dental bracket tray is designed to permit instruments to be arranged on it in the ordinary manner with the handle end of the instrument resting on the bottom of the tray, and the outer portion of the instruments arranged in one of the notches, as clearly illustrated in Fig. 1 of the drawing. The notches, which may be of any desired construction, are arranged at suitable intervals and space the instruments sufficiently to enable any one of them to be conveniently grasped without disturbing the others.

The dental bracket tray is square, and its dimensions correspond with those of the ordinary wooden dental bracket table 6, to enable the sanitary tray to be applied to wooden tables, as illustrated in Figs. 2 and 3 of the drawing. The sanitary tray 1 fits within the marginal flange or wall 7 of the wooden table 6, and the walls 3 extend above the upper edges of the flange 7, so that the scalloped edges are exposed for use. The outer faces of the marginal walls of the tray are vertical, and the inner faces of the marginal flanges 7 are also vertical, so that the tray by being constructed of a size to fit within the marginal flanges 7 is securely seated on and firmly supported by the wooden table 6 when in use. The frosted bottom besides serving to prevent the tray from slipping out of the hands enables the former to be more securely seated on the wooden dental bracket table, owing to the frictional engagement between the frosted bottom 4 of the tray and the felt covering 8, and there is no liability of the sanitary tray being accidentally knocked off the wooden table.

Having thus fully described my invention, what I claim as new and desire to secure by Letters Patent, is:—

The combination with a wooden dental bracket table provided at the top with upwardly extending marginal flanges having vertical inner faces, of a shallow sanitary tray of a size to fit snugly within the marginal flanges of the table and consisting of a flat bottom and marginal walls having vertical outer faces to fit the inner faces of the marginal flanges, said marginal walls being extended above the marginal flanges of the table and provided with scalloped upper edges exposed above the said marginal flanges and forming instrument-receiving notches.

In testimony, that I claim the foregoing as my own, I have hereto affixed my signature in the presence of two witnesses.

GUSTAV HOLTZ.

Witnesses:
MAHLON S. DRAKE,
GEO. MARSHALL.